R. M. PALMER.
BUMPER FOR AUTOMOBILES.
APPLICATION FILED JUNE 4, 1917.

1,247,569.

Patented Nov. 20, 1917.

Inventor
Ray M. Palmer
by Hazard & Miller
Att'ys.

UNITED STATES PATENT OFFICE.

RAY M. PALMER, OF PASADENA, CALIFORNIA, ASSIGNOR OF ONE-THIRD TO LOUIS N. HARVEY AND ONE-THIRD TO MARION M. PALMER, BOTH OF PASADENA, CALIFORNIA.

BUMPER FOR AUTOMOBILES.

1,247,569.  Specification of Letters Patent.  Patented Nov. 20, 1917.

Application filed June 4, 1917. Serial No. 172,668.

*To all whom it may concern:*

Be it known that I, RAY M. PALMER, a citizen of the United States, residing at Pasadena, in the county of Los Angeles and State of California, have invented new and useful Improvements in Bumpers for Automobiles, of which the following is a specification.

This invention relates to an automobile construction and particularly pertains to a bumper therefor.

When driving an automobile through crowded city districts it is often inconvenient to pass through traffic, due to the entanglement of the horns of the vehicle bumpers with other cars. This is particularly true when the car is being backed into or driven from a parking space. It is the principal object of this invention to provide a bumper which may be used in the front and rear of a motor vehicle and which may be manipulated to permit the car to maneuver in a smaller space than would otherwise have been possible, without personal damage or damage to other vehicles.

Another object of this invention is to provide a bumper which is identical in general appearance with the bumpers in present use and which incorporates features whereby its horns may be swung to provide clearance space.

It is a further object of this invention to provide a bumper formed of few parts, simple in their construction, easily manufactured and readily assembled, said parts being so designed as not liable to become broken, or inoperative.

Other objects will appear hereinafter.

The invention is illustrated, by way of example, in the accompanying drawings in which.

Figure 3:
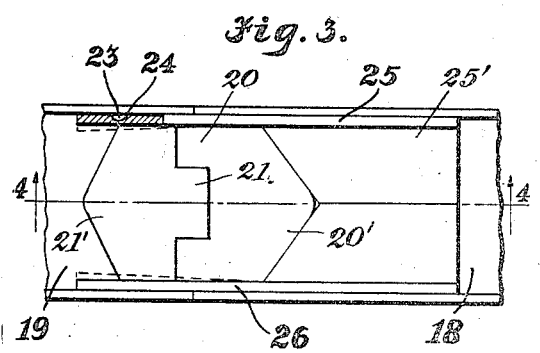
Fig. 3 is an enlarged view in elevation, as seen on the line 3—3 of Fig. 2, with parts broken away to more clearly disclose the hinge construction.
Figure 4:
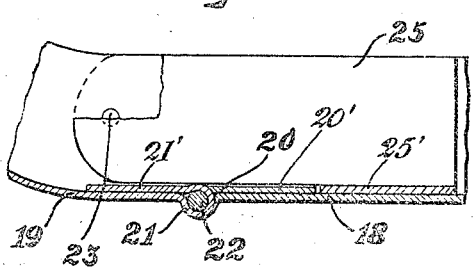
Fig. 4 is a view in longitudinal section, as seen on the line 4—4 of Fig. 3, illustrating the manner in which the bumper horns are secured at the end of the bumper body.

Referring more particularly to the drawings, 10 indicates an automobile having a frame 11 adapted to rest upon a front axle 12. This axle is fitted with front wheels 13, and 14 of common design. Secured to the forward end of the frame and in a horizontal position before the wheels is a bumper 15. This member is commonly formed of channel iron, the ends of which are curved to form horns 16 and 17 which extend rearwardly and terminate at points slightly in front of and at the outer sides of the wheels. In the present construction the horns are not formed integral with the main portion of the bumper, but are hinged thereto, as particularly indicated in Figs. 3 and 4 of the drawings. In these views it will be seen that vertical side walls or central webs 18 and 19 are shaped to form loops 20 and 21. These loops form eyes for hinge pins 22 and permit the horns to swing through a horizontal plane. The upper and lower legs of the channel are cut square, as particularly shown in Fig. 2 of the drawings. This forms perfectly smooth joints which cause the bumper to appear as having been made from a single piece of channel. The channel legs of the horns of the bumper are formed with protrusions 23 which rest within recesses 24 formed in the faces of spring catch plates 25 and 26, which are secured within the channels and are adapted to over-lap the joints. The plates 25 and 26 are preferably formed integral from a piece of channed bar adapted to fit within the main channel bar 15, the central web of the inserted channel bar being cut away to fit the hinge members 20' and 21' and leaving a web portion 25' connecting the rigid ends of the plates. When the bumpers are in their normal position, as indicated by full lines in Fig. 2, the catch plates will be sprung over the protrusions and will hold the bumper horns in place.

Figure 1:
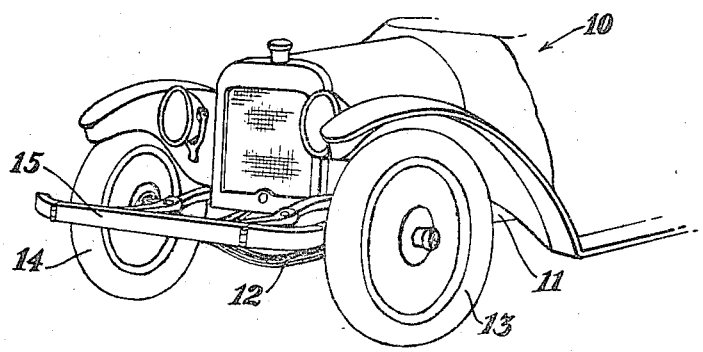
Figure 1 is a view in perspective illustrating the forward end of a motor vehicle and particularly showing the disposition of a bumper in relation thereto.
Figure 2:
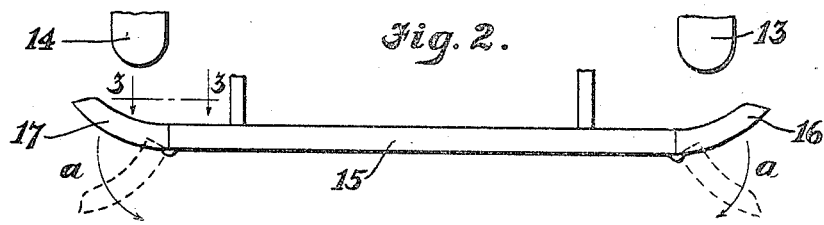
Fig. 2 is an enlarged view in plan illustrating the bumper with which the present invention is concerned and further discloses the normal and operative positions of the bumper horns.

In operation, the bumpers are normally in the position indicated by solid lines in Fig. 2 of the drawings. When the vehicle backs it may occur that the horns of the bumper encounter some portion of another vehicle. The movement of the bumper will cause the horn to be swung forwardly in the direction indicated by the arrow —a— in Fig. 2. This will, of course, release the catch plates from the protrusions and will cause the horn to assume the dotted line position, as shown in Fig. 2. In this manner clearance will be automatically made and an accident avoided.

It will thus be seen that the device here disclosed is simple in construction, may be easily operated and will insure that the bumper will not be damaged when encountering another vehicle in the manner previously described.

While I have shown the preferred form of my bumper for automobiles as now known to me, it is evident that various changes in the combination, construction and arrangement of parts may be made by those skilled in the art without departing from the spirit of my invention.

I claim:

A bumper for automobiles comprising a central channel bar, horns of channel bar fitting against the ends of the central channel bar, hinge members formed integral with the meeting ends of the central channel bar and the horns, hinge pins connecting the hinge members together, spring catch plates fixed in the ends of the central channel bar and extending into the ends of the horns and having catch depressions, and projections extending inwardly from the flanges of the horns to engage in said depressions.

In testimony whereof I have signed my name to this specification.

RAY M. PALMER.